Dec. 6, 1966 L. S. TAYLOR ETAL 3,289,477
FLOAT FOR LIQUID LEVEL GAUGE
Filed Sept. 28, 1965 2 Sheets-Sheet 1
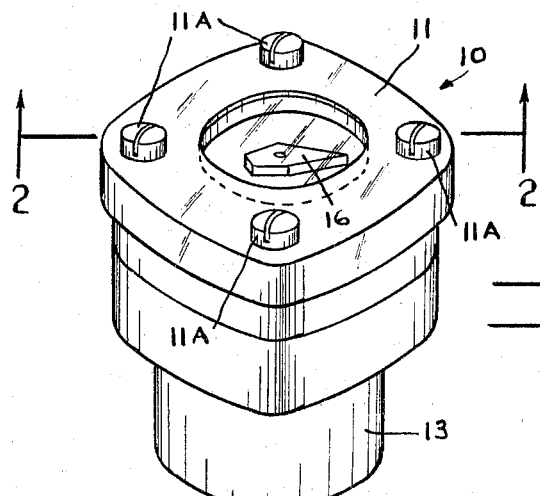
Fig. 1.
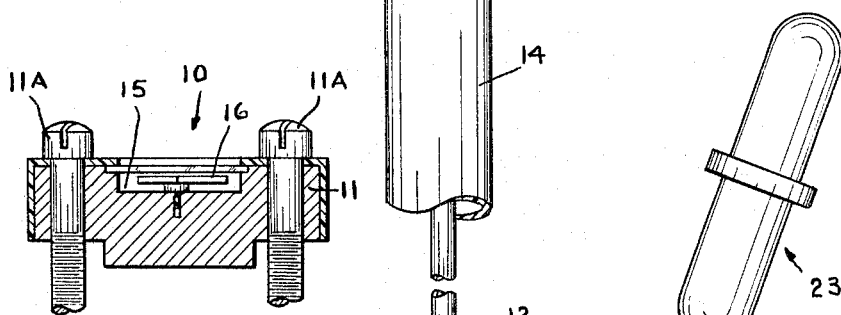
Fig. 2.
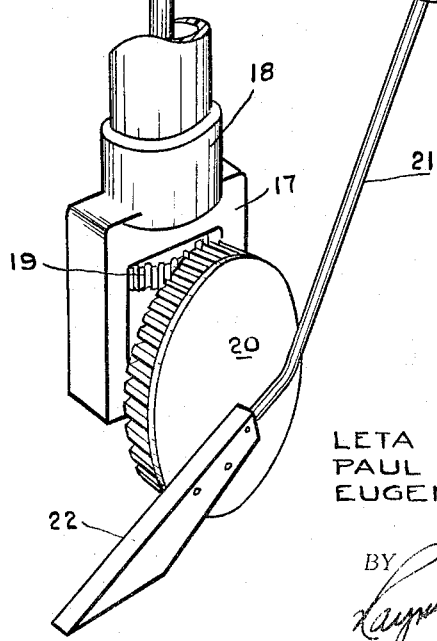
INVENTORS.
LETA S. TAYLOR
PAUL B. JOHNSON
EUGENE D. HUSKEY.
BY
ATTORNEY.

INVENTORS.
LETA S. TAYLOR
PAUL B. JOHNSON
EUGENE D. HUSKEY

BY
ATTORNEY.

United States Patent Office 3,289,477
Patented Dec. 6, 1966

3,289,477
FLOAT FOR LIQUID LEVEL GAUGE
Leta S. Taylor, Paul B. Johnson, and Eugene D. Huskey, all of Garland, Tex., assignors to J. Y. Taylor Company, a corporation of Texas
Filed Sept. 28, 1965, Ser. No. 490,907
4 Claims. (Cl. 73—322.5)

This invention relates to floats for liquid level gauges and has particular reference to a new and improved float and process of making same, which float is of the type adapted for use with liquid level gauges employed in storage tanks containing fluids or liquified gases stored under pressure such as butane and propane.

An object of the invention is to provide a new and improved float arrangement for liquid level gauges of the type set forth which is simpler and more economical in construction, yet more efficient in operation.

Another object is to provide a new and improved float arrangement of the type set forth which allows its use in a greater range of fluids without damage to the gauge components than prior type gauges.

Another object is to provide a new and improved float arrangement which may be adapted for use with various storage tanks and/or fluids or liquified gases.

Another object is to provide a new and improved float arrangement for a liquid level gauge, which float is adapted to withstand the internal pressures of gases in such tanks, and which float is relatively simple and economical in construction but will also resist chemical reaction from the liquified gases or liquids in the tank, and which enables its uses in a greater range of liquids.

Another object is to provide a new and improved float for liquid level gauges which is formed of a material which will allow the assembly of components in such manner and by such process as to allow such components to become effectively integral.

Another object is to provide a float for a liquid level gauge wherein the parts normally subject to wear are made of a material which is wear resistant.

Another object is to provide a new and improved process of making a float of the type set forth.

Another object is to provide a new and improved float for liquid level gauges and process of making same, wherein all of the components may be made of relatively inexpensive material which is capable of manufacture by molding or casting and which may be so united as to form an effectively integral construction.

Other objects and advantages of the invention will be apparent from the following description taken in connection with the accompanying drawings wherein a preferred form of the invention and process are shown and described by way of illustration only.

Referring to the drawings:

FIG. 1 is a perspective view, partially in section, of a liquid level gauge embodying the float of the invention;

FIG. 2 is a sectional view of the gauge head of the gauge shown in FIG. 1, which view is taken on line 2—2 of FIG. 1, looking in the direction of the arrows;

Figure 3:
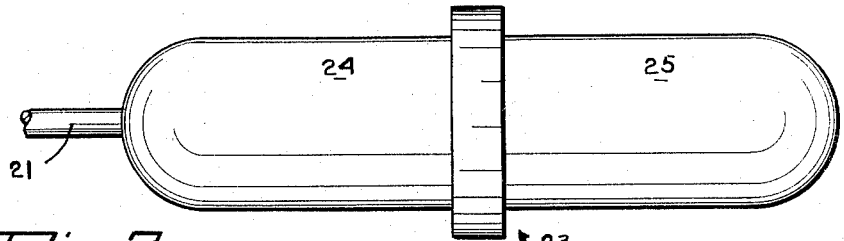
FIG. 3 is a side view of the float and float rod arrangement.

Referring more particularly to the drawings wherein similar reference characters designate corresponding parts throughout the several views, the liquid level gauge shown embodying the invention comprises a gauge head designated generally at 10, having the rim 11 through which are provided openings for bolts 11A or other suitable fastening means for securing the gauge head 10 in operative position over an opening in the storage tank. Gauge head 10 may be cast or molded of suitable plastic material, as hereinafter set forth, or die cast of aluminum or zinc depending upon the use intended.

Gauge head 10 is provided with a chamber for a drive magnet which is rigidly secured on the upper end of rotatably mounted shaft 12, whereby pivotal movement or rotation of the shaft effects simultaneous rotation or pivotal movement of the drive magnet. Shaft or rod 12 may be of chemically resistant plastic as hereinafter specified.

Gauge head 10 is formed with depending tubular portion 13 in telescoping relation with riser portion 14.

Within gauge head 10 is provided dial plate 15 which has indications thereon and pivoted indicator 16 is adapted to indicate on said dial plate the quantity of liquid in the tank.

The gauge head 10 is formed by casting or molding of suitable plastic material or die cast of aluminum zinc or other material depending upon the use to be made of the gauge.

The cast or molded plastic fork 17 has the tubular portion 18 adapted to receive the end of riser 14 and be secured thereto by staking or bonding by suitable chemicals dependent upon the plastic material of which the fork 17 and riser 14 are constructed.

Shaft 14 has its end portion extending through an opening in the wall of fork 17 and on the end of said shaft 12 is positioned driven gear 19 which is formed of cast or molded plastic and either pinned to the drive shaft 12 or formed thereon in the cast of a metal drive shaft or formed integral therewith in the case of a plastic drive shaft. The driven gear 19 is preferably formed to wear resistant material such as nylon.

The drive gear 20 is pivotally mounted on a pivot in fork 17. This drive gear 20 is preferably formed of wear resistant material such as nylon and meshes with driven gear 19 to thereby pivot drive shaft 12. Float rod 21 is a metal rod and counterweight 22 may be secured on the metal rod cast or molded to gear 20 which if a metal rod is employed can be plastic coated to render it more resistant to chemical reaction, or it can be of plastic and cast or molded integral with drive gear 20.

Float 23 is of chemically resistant plastic of the type of material herein set forth and is secured to metal float rod 21.

Figure 4:
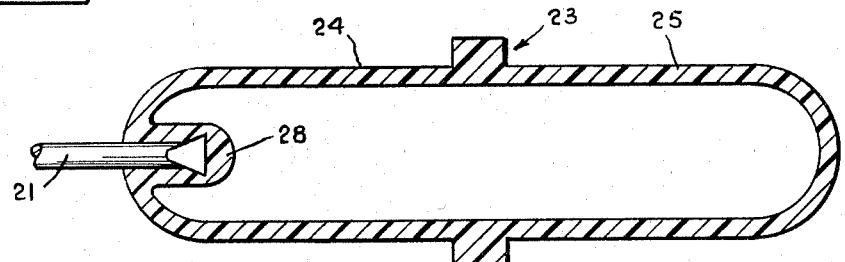
FIG. 4 is a longitudinal sectional view of the float of FIG. 3.
Figure 5:
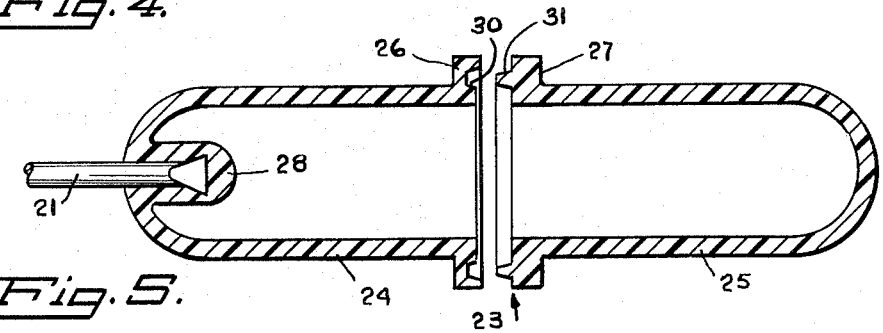
FIG. 5 is a sectional view illustrating a step in the process of making the float of the invention.
Figure 6:
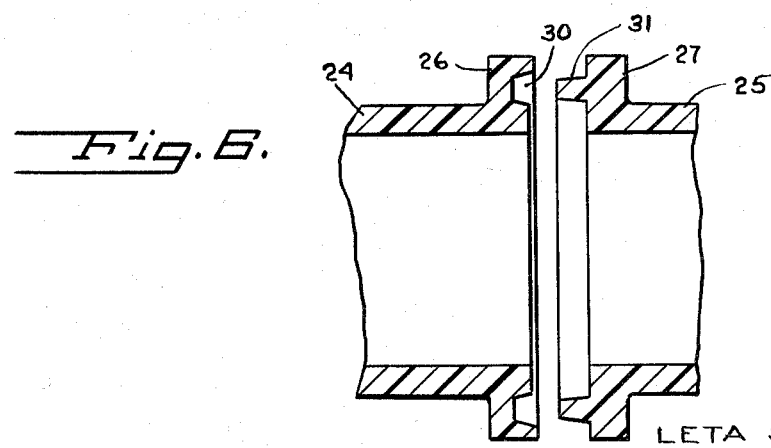
FIG. 6 is a fragmentary sectional view on an enlarged scale illustrating a step in the making of the float of the invention.

Float 23 is formed molded or cast plastic of two members 24 and 25 as shown in FIGS. 3 to 6 and indicated generally at 23. The two portions 24 and 25 are each provided with the flanges 26 and 27, respectively adjacent their open ends which flanges are united by spin welding or ultra-sonic welding to form an effectively integral float which does not leak.

In the manufacture of the float section 24 by molding the section has an opening molded therein which extends into integral projection or reinforced portion 28 which is provided adjacent the end of float section 24 to receive the end of float rod 21.

In the assembly of the float to the float rod, either the rod 21 or the float section 24 is heated and the end of rod 21 then has its end positioned in the opening in projection 28.

Upon cooling the end of float section 24 shrinks around the end of rod 21 forming an effectively united connection therebetween.

The float portions 24 and 25 are cast or molded of chemically resistant plastic such as those elsewhere specified herein but preferably nylon.

The counterweight 22 can be cast of chemically resistant plastic or metal and the mass or length can be controlled to control its weight.

In the manufacture of the liquid level gauge of this invention, the gauge head 10 may be formed of die cast metal such as aluminum or zinc or molded or cast of a plastic having sufficient strength such as nylon or an acrylonitrile-butadiene-styrene composition which is relatively stable, tough, hard and rigid and withstands acids and pressure and resists weather.

Other plastics which might be employed depending upon the material with which the gauge is to be used are nylon, polycarbonates, polystyrenes, acrylics, vinyls or others with suitable properties.

Other parts, such as the indicator head, connector riser, fork, drive rod, and drive gears may also be formed of such plastic materials.

Flange 26 has annular groove or recess 30 in its free end surface and flange 27 has tongue or projection 31 on its free end in operative position relative to groove 30 in flange 26.

The tongue 31 and groove 30 are preferably formed in their respective flanges beyond the plane of the surface of their respective float sections.

To join the sections the tongue 31 is positioned in groove 30 and the parts united by ultrasonic or spin welding.

Both groove 30 and tongue 31 have tapered side surfaces with groove 30 being wider than the width of the tongue 31 but the tongue 31 is longer than the depth of groove 30 whereby trapezoidal tongue 31 flows in both sides of groove 30 and as the sections 24 and 25 are drawn closer together, the tongue material flows up the groove sidewalls and the float halves are fused together and sealed pressure tight.

From the foregoing it will be seen that we have provided new and improved means for obtaining all of the objects and advantages of the invention.

We claim:

1. A float for a liquid level gauge, said float being made by forming two hollow float sections by molding chemically resistant plastic with each of said sections having an integral peripheral flange adjacent its open end, one of said flanges having a groove and the other of said sections having a tongue adapted to be positioned in said groove, said groove being wider than said tongue and said tongue being longer than the depth of said groove, uniting said sections by joining said flanges with said tongue in said groove to form an integral construction.

2. A float for a liquid level gauge, said float being made by forming two hollow float sections by molding chemically resistant plastic with each of said sections having an integral peripheral flange adjacent its open end, one of said flanges having a groove and the other of said sections having a tongue adapted to be positioned in said groove, said groove being wider than said tongue and said tongue being longer than the depth of said groove, uniting said sections by joining said flanges by welding with said tongue in said groove to form an integral construction.

3. A float for a liquid level gauge, said float being made by forming two hollow float sections by molding chemically resistant plastic with each of said sections having an integral peripheral flange adjacent its open end, one of said flanges having a groove and the other of said sections having a tongue adapted to be positioned in said groove, said groove being wider than said tongue and said tongue being longer than the depth of said groove, uniting said sections by joining said flanges by spin welding with said tongue in said groove to form an integral construction.

4. A float for a liquid level gauge, said float being made by forming two hollow float sections by molding chemically resistant plastic with each of said sections having an integral peripheral flange adjacent its open end, one of said flanges having a groove and the other of said sections having a tongue adapted to be positioned in said groove, said groove being wider than said tongue and said tongue being longer than the depth of said groove, uniting said sections by joining said flanges by ultra-sonic welding with said tongue in said groove to form an integral construction.

References Cited by the Examiner

UNITED STATES PATENTS

| 1,714,733 | 5/1929 | Shank | 73—322.5 X |
| 2,792,164 | 5/1957 | Cauffiel | 73—322.5 X |
| 3,120,570 | 2/1964 | Kennedy et al. | 274—45 |

FOREIGN PATENTS

| 144,522 | 1/1942 | Australia. |

LOUIS R. PRINCE, *Primary Examiner.*